(12) United States Patent
Nakaya et al.

(10) Patent No.: US 9,884,649 B2
(45) Date of Patent: Feb. 6, 2018

(54) LOWER VEHICLE-BODY STRUCTURE OF AUTOMOTIVE VEHICLE

(71) Applicant: MAZDA MOTOR CORPORATION, Hiroshima (JP)

(72) Inventors: Kouichi Nakaya, Aki-gun (JP); Munenari Takahashi, Hiroshima (JP); Masaki Mori, Irvine, CA (US)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/951,556

(22) Filed: Nov. 25, 2015

(65) Prior Publication Data

US 2016/0159402 A1    Jun. 9, 2016

(30) Foreign Application Priority Data

Dec. 5, 2014   (JP) .................. 2014-246525

(51) Int. Cl.
| | |
|---|---|
| *B62D 21/15* | (2006.01) |
| *B62D 25/20* | (2006.01) |
| *B60N 2/005* | (2006.01) |
| *B60N 2/015* | (2006.01) |

(52) U.S. Cl.
CPC .......... *B62D 21/157* (2013.01); *B60N 2/005* (2013.01); *B60N 2/015* (2013.01); *B62D 25/20* (2013.01); *B62D 25/2036* (2013.01)

(58) Field of Classification Search
CPC .. B62D 21/157; B62D 25/20; B62D 25/2036; B60N 2/015; B60N 2/005
See application file for complete search history.

(56) References Cited

U.S. PATENT DOCUMENTS

| | | | |
|---|---|---|---|
| 5,671,968 A | 9/1997 | Masuda et al. | |
| 6,840,119 B2 * | 1/2005 | Aoki .................. | G01G 19/4142 73/862.53 |
| 2007/0126264 A1* | 6/2007 | Mizuma ................. | B60N 2/015 296/204 |
| 2016/0068196 A1* | 3/2016 | Saeki ................. | B62D 25/2036 296/187.08 |

FOREIGN PATENT DOCUMENTS

| | | | | |
|---|---|---|---|---|
| EP | 2230156 A1 | * | 9/2010 | ........... B62D 21/157 |
| JP | S63-128141 U | | 8/1988 | |
| JP | H08-072740 A | | 3/1996 | |
| JP | 2007-269052 A | | 10/2007 | |
| JP | 2013-103528 A | | 5/2013 | |

\* cited by examiner

*Primary Examiner* — Glenn Dayoan
*Assistant Examiner* — Melissa A Black
(74) *Attorney, Agent, or Firm* — Studebaker & Brackett PC

(57) ABSTRACT

A single cross member extending in a vehicle width direction is provided between a portion of a side sill which is positioned near a center pillar and a tunnel portion. A pair of seat-rail mounting seats are provided at a lower portion of the tunnel portion to be spaced apart from the cross member in a vehicle longitudinal direction. A seat rail is rigidly connected to the pair of seat-rail mounting seats at its bottom face. Thereby, the lightweight, high rigidity, and quietness of the vehicle can be attained.

6 Claims, 8 Drawing Sheets

LOWER VEHICLE-BODY STRUCTURE OF AUTOMOTIVE VEHICLE

BACKGROUND OF THE INVENTION

The present invention relates to a lower vehicle-body structure of an automotive vehicle which comprises a tunnel portion provided at a central portion, in a vehicle width direction, of a floor panel and extending in a vehicle longitudinal direction, right-and-left side sills provided at right-and-left both-side portions of the floor panel and extending in the vehicle longitudinal direction, and right-and-left intermediate pillars extending in a vehicle vertical direction from the right-and-left side sills.

In general, a lower vehicle-body structure of an automotive vehicle uses a seat-rail support structure in which a cross member extending in the vehicle width direction is provided between a portion of a side sill which is positioned near a center pillar and a tunnel portion, another cross member is provided in front of the above-described cross member, and a seat rail is supported at the front-and-rear both cross members.

The two cross members are necessary in the above-described structure. Accordingly, another lower vehicle-body structure has been proposed in order to reduce a vehicle weight, in which a single cross member extending in the vehicle width direction is provided between a portion of the side sill which is positioned near the center pillar and the tunnel portion, a seat-rail mounting seat is provided at a floor panel or the tunnel portion, and the seat rail is attached to the cross member and the seat-rail mounting seat and supported at these members.

The above-described conventional structure can reduce the vehicle weight by using the single cross member, not two members. However, since a range where the tunnel portion is not supported at any frame structural body becomes larger, this conventional structure has a problem that a mouth opening deformation of a front-side portion of the single tunnel portion positioned in front of the cross member and a rear-side portion of the tunnel portion positioned in back of the single cross member is improperly enlarged, so that noises may be caused and thereby quietness in a cabin may deteriorate.

Herein, it may be considered that a bracket for forming the seat-rail mounting seat is so prolonged in the vehicle longitudinal direction that move of the tunnel portion can be suppressed by this bracket. However, this long bracket may cause an weight increase improperly despite the above-described weight reduction attained by using the single cross member. Therefore, there is still room for improvement.

Meanwhile, Japanese Patent Laid-Open Publication No. 2013-103528 discloses a structure in which a front portion of a seat rail is attached to and supported at a cross member which is provided between a side sill and a tunnel portion, and a rear portion of the seat rail is attached to and supported at a seat-rail mounting seat which is provided at the tunnel portion.

This structure of the patent document has a problem that the mouth opening deformation of the tunnel portion at a position which corresponds to a lower portion of a center pillar becomes so larger, compared to the conventional structure using the two cross members, that the noise performance may deteriorate.

The inventors of the present invention conducted some experiments repeatedly and finally found that in a case in which the single cross member is used, the tunnel portion moves around this cross member such that its front and rear portions move in a reverse phase. Consequently, the inventors made the present invention by focusing on this reverse-phase move of the tunnel portion.

SUMMARY OF THE INVENTION

An object of the present invention is to provide a lower vehicle-body structure of an automotive vehicle which can properly attain the lightweight, high rigidity, and quietness of the vehicle.

The present invention is a lower vehicle-body structure of an automotive vehicle which comprises a tunnel portion provided at a central portion, in a vehicle width direction, of a floor panel and extending in a vehicle longitudinal direction, right-and-left side sills provided at right-and-left both-side portions of the floor panel and extending in the vehicle longitudinal direction, right-and-left intermediate pillars extending in a vehicle vertical direction from the right-and-left side sills, a pair of single cross members, each of which extends in a vehicle width direction between a portion of the side sill which is positioned near the intermediate pillar and the tunnel portion, a pair of seat-rail mounting seats provided at a lower portion of the tunnel portion to be spaced apart from the cross member in the vehicle longitudinal direction, and a seat rail rigidly connected to the pair of seat-rail mounting seats at a bottom face thereof. Herein, the above-described intermediate pillar can be a center pillar.

According to the present invention, since the single cross member extending in the vehicle width direction is provided between the portion of the side sill positioned near the intermediate pillar (center pillar) and the tunnel portion, the lightweight of the vehicle and the reverse phase of the mouth opening deformation of the front-side portion of the tunnel portion positioned in front of the cross member and the rear-side portion of the tunnel portion positioned in back of the cross member can be properly attained. Further, since the seat-rail mounting seats are provided at a position where the above-described reverse-phase deformation occurs greatly, that is—at the lower portion of the tunnel portion to be spaced apart from the cross member in the vehicle longitudinal direction, and the seat rail is rigidly connected to the seat-rail mounting seats at its bottom face, the rigidity of the seat rail becomes so high that the proof stress of the seat rail against the above-described reverse-phase vibration which may cause the seat rail to deform can be properly increased. Accordingly, the seat rail can be prevented from being twisted, so that the vibration can be suppressed. Thereby, the lightweight, high rigidity, and quietness of the vehicle can be attained by utilizing the seat structure itself, without reinforcing the vehicle body itself.

In an embodiment of the present invention, respective upper portions of the right-and-left intermediate pillars are connected to a roof reinforcement which extends in the vehicle width direction along a lower portion of a roof panel. According to this embodiment, a ring-shaped frame structure which comprises the roof reinforcement, the right-and-left intermediate pillars (center pillars), and the pair of cross members is formed, so that the structure highly resistant to twisting of the vehicle body can be provided.

In another embodiment of the present invention, a tunnel reinforcement is provided at an upper face of a front portion of the tunnel portion, and a rear portion of the tunnel reinforcement and the front seat-rail mounting seat are rigidly connected to each other. According to this embodiment, a tunnel-vibration suppressing area can be enlarged forward by the rigid connection of the tunnel reinforcement and the seat-rail mounting seat.

In another embodiment of the present invention, the cross member and the seat rail are provided to be spaced apart from each other. According to this embodiment, the shape or arrangement position of the cross member can be effectively set against the vehicle side collision regardless of the attachment structure of the seat rail with a properly lightweight structure.

In another embodiment of the present invention, the seat-rail mounting seat is connected to a tunnel groove which is provided at the lower portion of the tunnel portion to extend in the vehicle longitudinal direction. According to this embodiment, the rigidity of the lower portion of the tunnel portion can be further increased, so that the vibration can be properly suppressed.

Other features, aspects, and advantages of the present invention will become apparent from the following description which refers to the accompanying drawings.

DETAILED DESCRIPTION OF THE INVENTION

Figure 1:
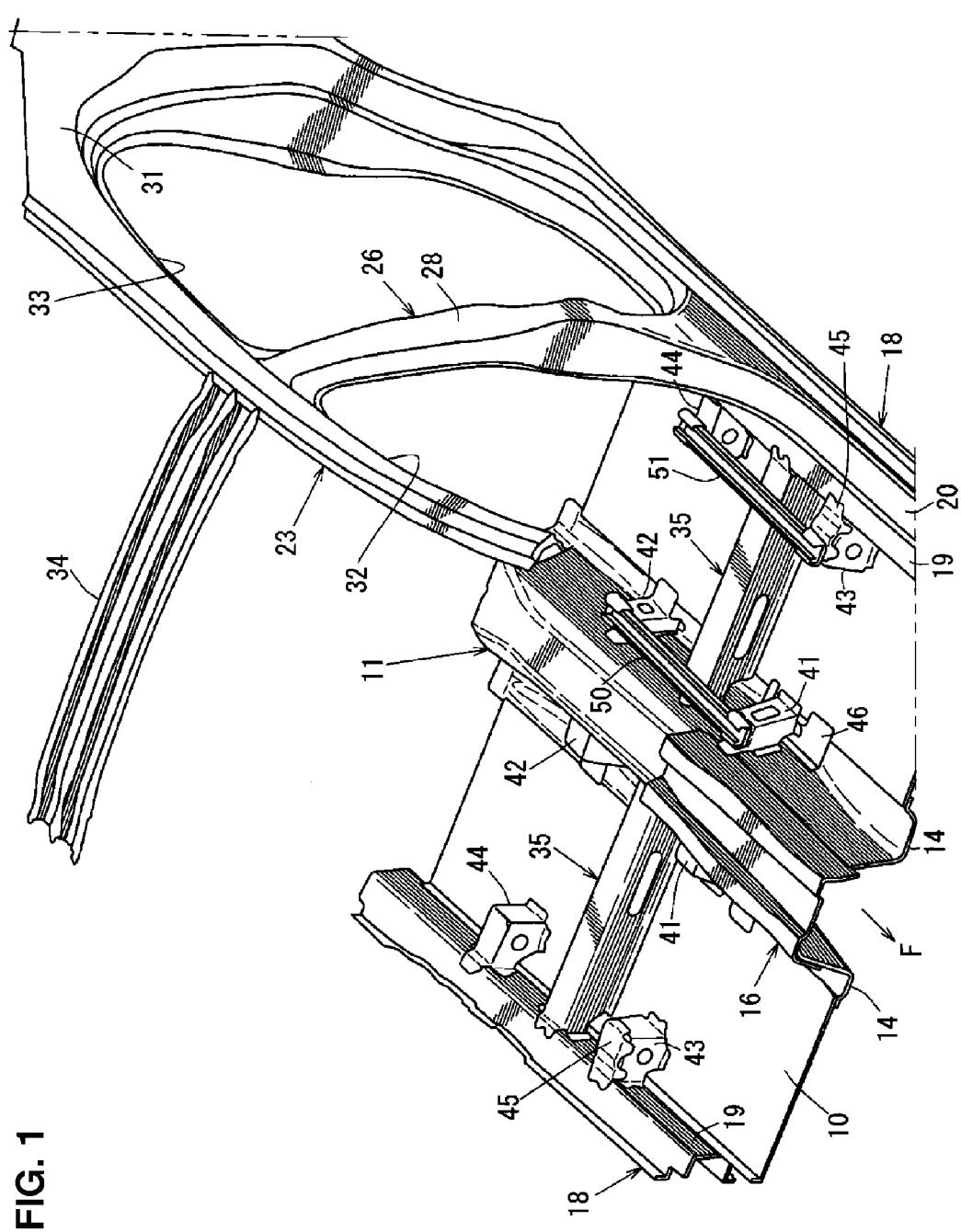
FIG. 1 is a perspective view showing a lower vehicle-body structure of an automotive vehicle of the present invention.
Figure 4:
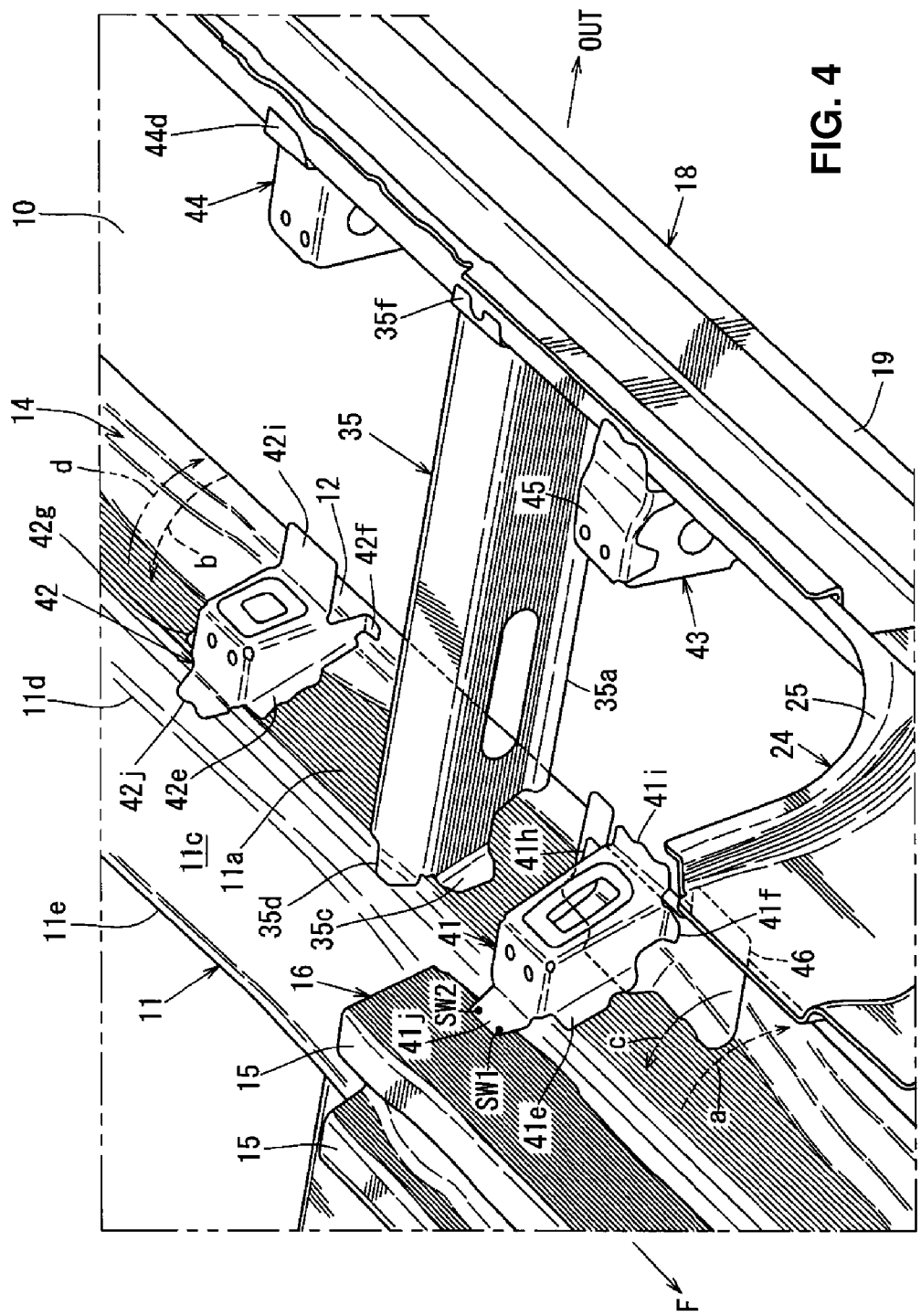
FIG. 4 is an enlarged perspective view of a vehicle-left side of FIG. 3.
Figure 5:
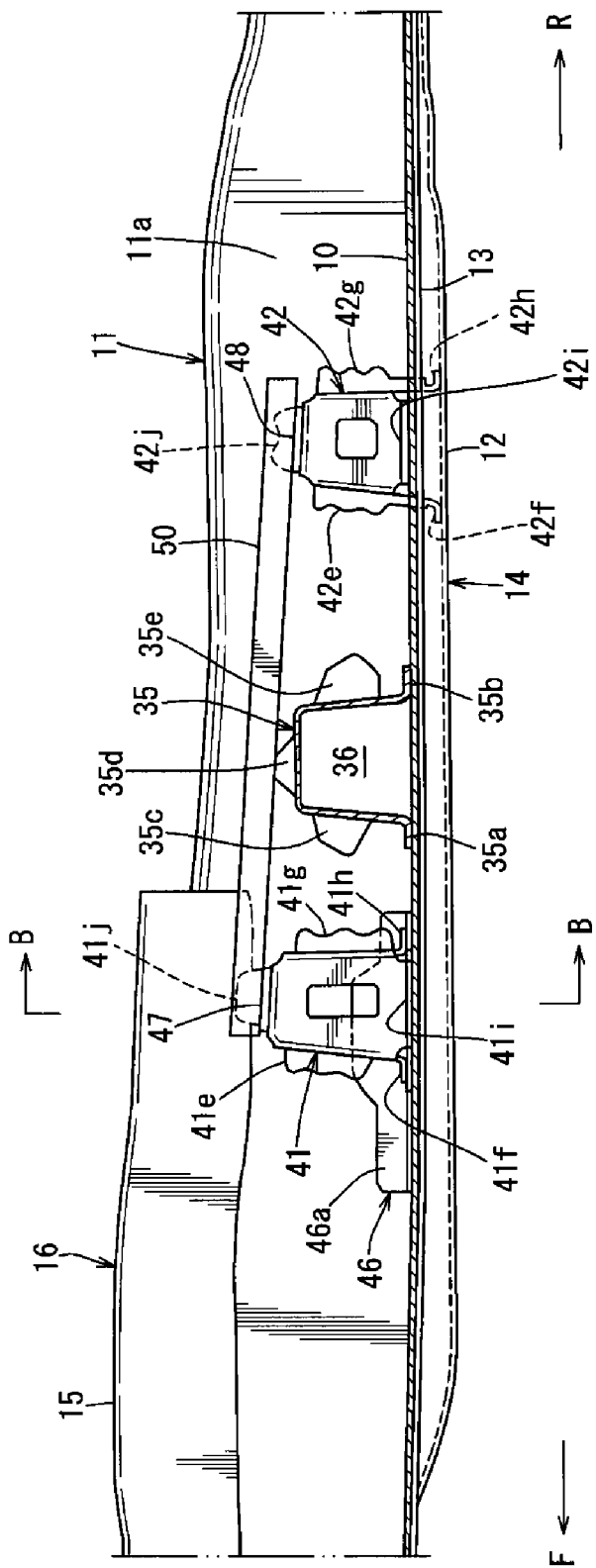
FIG. 5 is a sectional view taken along line A-A of FIG. 3.

Hereafter, an embodiment of the present invention will be described referring to the drawings. The drawings show a lower vehicle-body structure of an automotive vehicle. FIG. 1 is a perspective view showing a lower vehicle-body structure of an automotive vehicle of the present invention, FIG. 2 is an exploded perspective view of the lower vehicle-body structure and a seat, FIG. 3 is a major-part enlarged perspective view of FIG. 1, FIG. 4 is an enlarged perspective view of a vehicle-left side of FIG. 3, FIG. 5 is a sectional view taken along line A-A of FIG. 3, and FIG. 6 is a sectional view taken along line B-B of FIG. 5.

Figure 2:
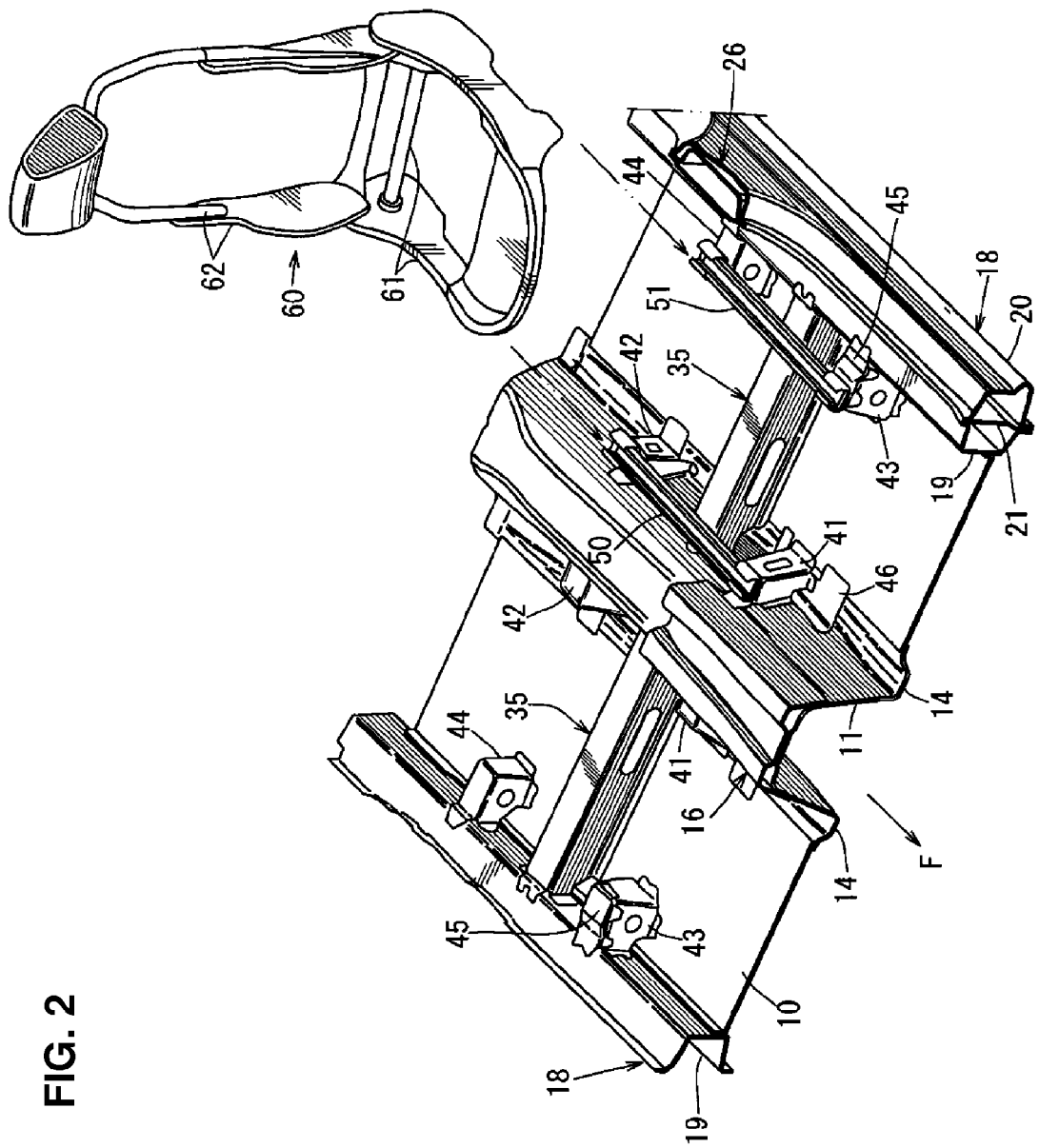
FIG. 2 is an exploded perspective view of the lower vehicle-body structure and a seat.
Figure 3:
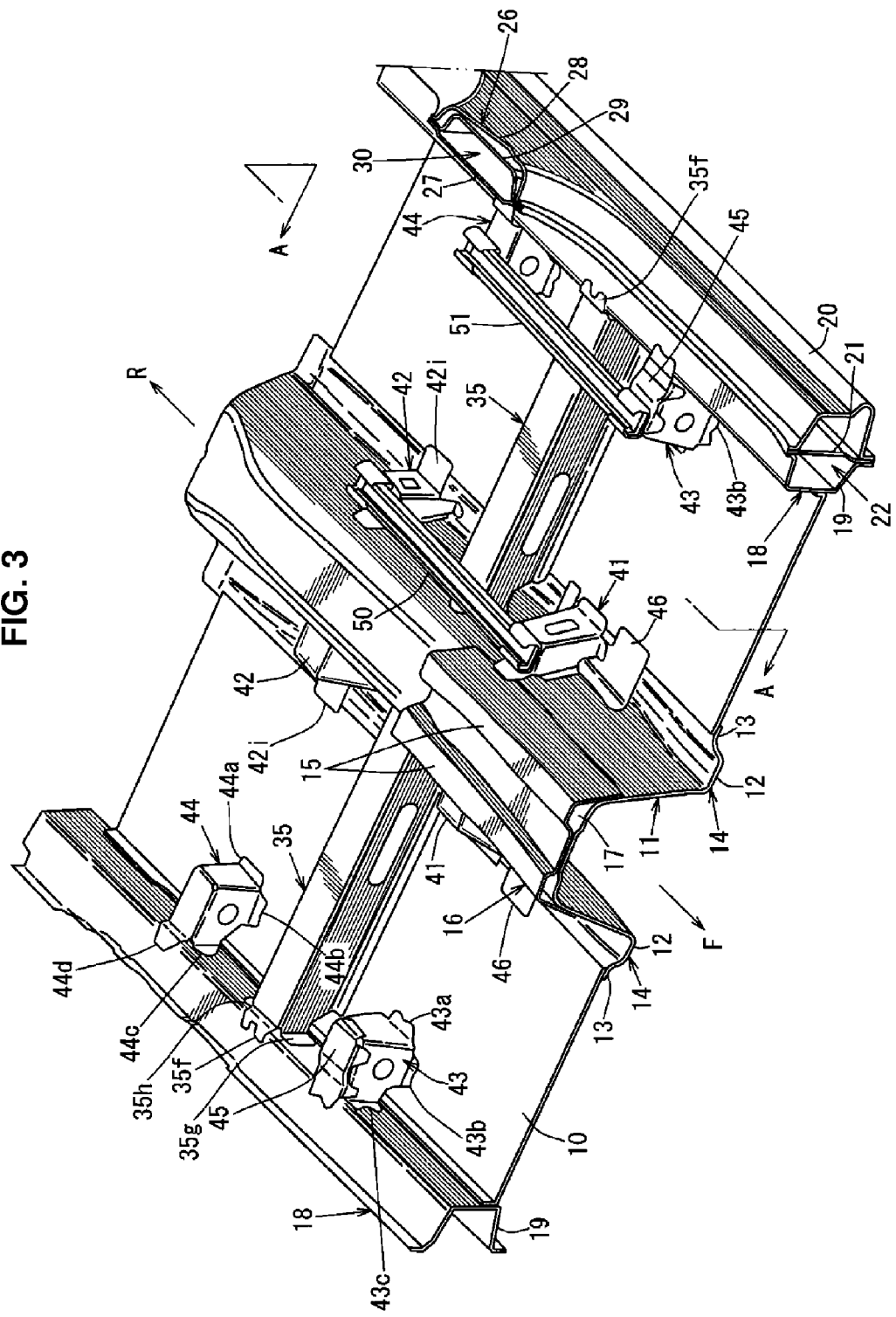
FIG. 3 is a major-part enlarged perspective view of FIG. 1.

In FIGS. 1, 2 and 3, a floor panel 10 (specifically, a front floor panel) which forms a floor face of a cabin is provided, and a tunnel portion 11 which projects into the cabin and extends in a vehicle longitudinal direction is formed at a central portion, in a vehicle width direction, of the floor panel 10.

Figure 6:
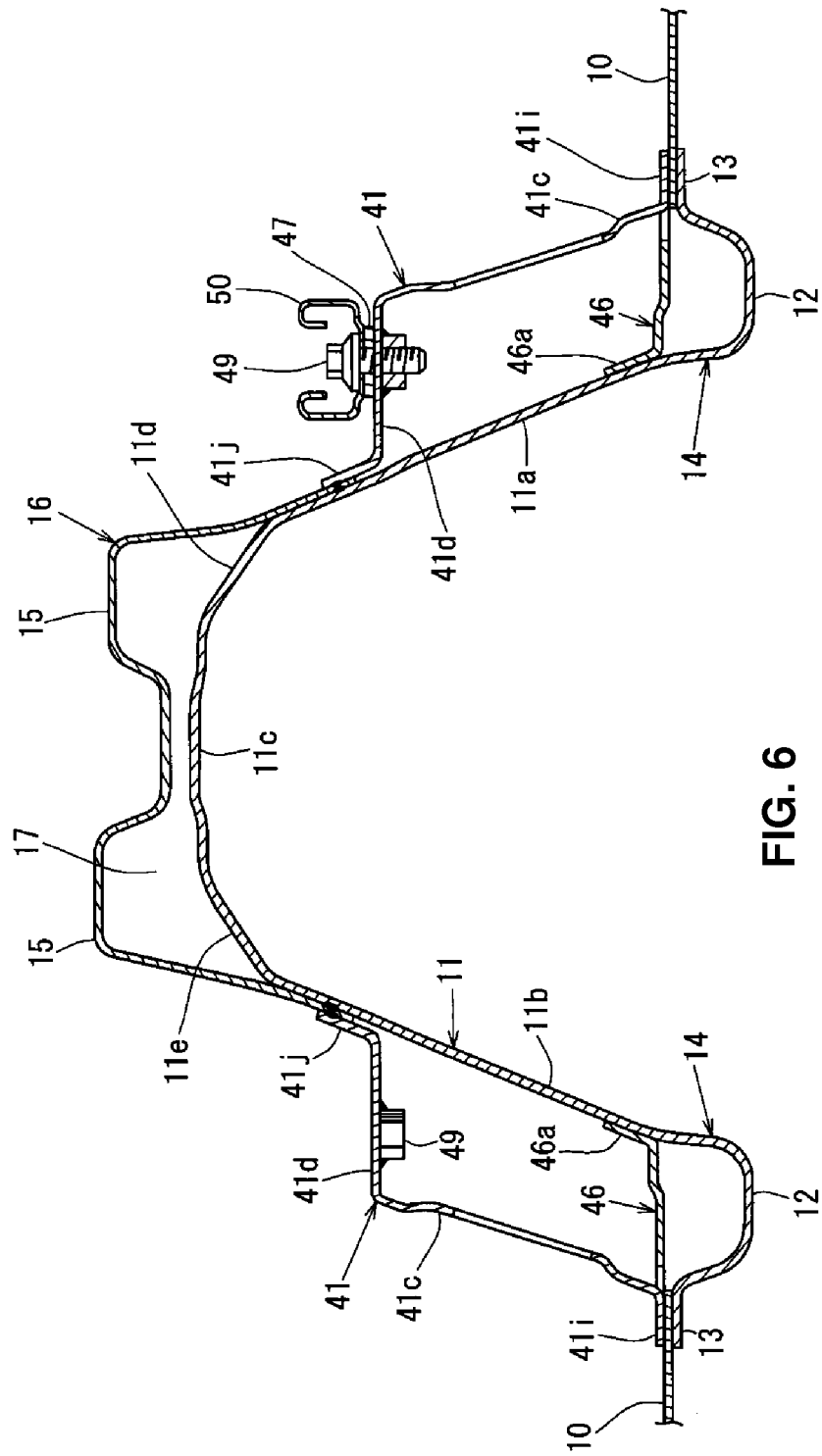
FIG. 6 is a sectional view taken along line B-B of FIG. 5.

In the present embodiment, the floor panel 10 and the tunnel portion 11 are formed separately as shown in FIG. 6. However, these 10, 11 may be formed integrally.

As shown in FIG. 6, right-and-left side walls 11a, 11b of the tunnel portion 11 extend downward below the level of the floor panel 10, and at right-and-left lower edge portions of the tunnel portion 11 are provided tunnel lower edge grooves 14, each of which comprises a bottom wall 12 and a joint flange 13 connected to the floor panel 10 and is formed in a recess shape in a front view of the vehicle.

The above-described tunnel portion 11 extends in the vehicle longitudinal direction from a dash lower panel to a rear cross member (a so-called No. 3 cross member). A tunnel reinforcement 16 (a so-called high-mount backbone frame) which comprises two projections 15, 15 extending in the vehicle longitudinal direction along upper faces of right-and-left corner portions 11d, 11e of an upper wall 11c of the tunnel portion 11 is fixedly joined to an upper face of a front portion of this tunnel portion 11 by welding means, such as spot welding. A closed cross section 17 extending in the vehicle longitudinal direction is formed between the tunnel reinforcement 16 and the tunnel portion 11.

The above-described tunnel reinforcement 16 extends in the vehicle longitudinal direction from the dash lower panel to an arrangement position of a center-console mounting bracket as shown in FIGS. 1-3.

The rigidity of the tunnel portion 11 is increased by the closed cross section 17 provided between the tunnel portion 11 and the tunnel reinforcement 16 and the recess-shaped closed cross section of the tunnel lower edge groove 14.

As shown in FIGS. 1 and 3, a pair of side sills 18 are fixedly joined to right-and-left both side portions of the floor panel 10. As shown in FIG. 3, the side sill 18 is a vehicle-body strengthening member that comprises a side sill inner 19, a side sill outer 20, and a side sill reinforcement 21 which are joined together and has a side-sill closed cross section 22 extending in the vehicle longitudinal direction.

As shown in FIG. 1, the above-described side sill 18 extending in the vehicle longitudinal direction is provided at a lower portion of the vehicle, and a roof side rail 23 extending in the vehicle longitudinal direction is provided at an upper portion of the vehicle. The roof side rail 23 and the side sill 18 are interconnected vertically by a front pillar, not illustrated, and a hinge pillar 24 shown in FIG. 4 at their front end portions.

The hinge pillar 24 is a vehicle-body strengthening member which comprises a hinge pillar inner 25, a hinge pillar outer, and a hinge pillar reinforcement which are joined together and has a hinge-pillar closed cross section extending in the vehicle vertical direction. In FIG. 4, the hinge pillar inner 25 is illustrated only.

Further, as shown in FIG. 1, the roof side rail 23 and the side sill 18 are interconnected vertically by a center pillar 26 as an intermediate pillar at their middle portions. The center pillar 26 is a vehicle-body strengthening member that comprises a center pillar inner 27, a center pillar outer 28, and a center pillar reinforcement 29 which are joined together and has a center-pillar closed cross section 30 extending in the vehicle vertical direction as shown in FIG. 3.

Further, as shown in FIG. 1, the roof side rail 23 and the side sill 18 are interconnected vertically by a rear pillar 31 having a closed cross-section structure at their rear end portions.

As shown in FIG. 1, a front-door opening portion 32 is formed at a vehicle-body side portion as an opening portion which is enclosed by the side sill 18, the center pillar 26, the roof side rail 23, the front pillar, and the hinge pillar 24 (see FIG. 4). Also, a rear-door opening portion 33 is formed at the vehicle-body side portion as an opening portion which is enclosed by the side sill 18, the center pillar 26, the roof side rail 23, and the rear pillar 31.

While the respective left-side ones of the center pillar 26, the roof side rail 23, and the rear pillar 31 are illustrated in FIG. 1 for convenience, these members 26, 23, 31 are provided on both sides of the vehicle, respectively.

As shown in FIG. 1, respective upper portions of the right-and-left center pillars 26, 26 are connected to a roof reinforcement 34 which extends in the vehicle width direction along a lower portion of the roof panel (not illustrated). That is, both end portions, in the vehicle width direction, of the roof reinforcement 34 are fixedly joined to the roof side rails 23, and respective upper end portions of the center pillars 26 are fixedly joined to the roof side rails 23. Thus, the both members 34, 26 are connected via the roof side rail 23.

By connecting the upper portions of the right-and-left center pillars 26, 26 to the roof reinforcement 34 extending in the vehicle width direction along the lower portion (not illustrated) of the roof panel as described above, a ring-shaped frame structure which comprises the roof reinforcement 34, the right-and-left center pillars 26, 26, and right-and-left cross members 35, which are specifically described below, is formed so that the structure which is highly resistant to twisting of the vehicle body can be provided.

The lower vehicle-body structure of the automotive vehicle of the present embodiment comprises the tunnel portion 11 provided at the central portion, in the vehicle width direction, of the floor panel 10 and extending in the vehicle longitudinal direction, the closed cross-section structure side sills 18, 18 provided at the right-and-left both side portions of the floor panel 10 and extending in the vehicle longitudinal direction, and the right-and-left center pillars 26, 26 extending in the vehicle vertical direction from the right-and-left side sills 18, 18. Further, as shown in FIGS. 1-5, a pair of single cross members 35 (a so-called No. 2 cross member), each of which extends in the vehicle width direction between a portion of the side sill 18 which is positioned near the center pillar 26 and the tunnel portion 11, and a closed cross section 36 extending in the vehicle width direction is formed between the cross member 35 and the floor panel 10 as shown in FIG. 5. Herein, it is preferable that the cross member 35 be arranged at a root (base) portion of the center pillar 26 so as to efficiently transmit a load of a vehicle side collision.

As shown in FIG. 5, the cross member 35 is configured to have a hat-shaped cross section, joint flange portions 35*a*, 35*b* which are provided at front-and-rear both sides of a lower end portion of the cross member 35 are fixedly joined to the floor panel 10, and plural joint flange portions 35*c*, 35*d*, 35*e* which are provided at an inward-side end portion, in the vehicle width direction, of the cross member 35 are fixedly joined to the side wall 11*b* or the side wall 11*b* of the tunnel portion 11.

Further, as shown in FIGS. 3 and 4, the cross member 35 includes plural joint flange portions 35*f*, 35*g*, 35*h* at its outward-side end portion, and these joint flange portions 35*f*, 35*g*, 35*h* are fixedly joined to the side sill inner 19.

Herein, in a case in which the single cross member 35 is provided between the portion of the side sill 18 positioned near the center pillar 26 and the tunnel portion 11 for the purpose of the weight reduction of the vehicle, when a front-side portion of the tunnel portion 11 positioned in front of the cross member 35 deforms in a mouth-closing direction shown by a broken-line arrow a as shown in FIG. 4, a rear-side portion of the tunnel portion 11 positioned in back of the cross member 35 deforms in a mouth-opening direction shown by a broken-line arrow b shown in FIG. 4. Meanwhile, when the front-side portion of the tunnel portion 11 positioned in front of the cross member 35 deforms in the mouth-opening direction shown by an imaginary-line arrow c as shown in FIG. 4, the rear-side portion of the tunnel portion 11 positioned in back of the cross member 35 deforms in the mouth-closing direction shown by an imaginary-line arrow d shown in FIG. 4.

That is, the front-side portion of the tunnel portion 11 positioned in front of the cross member 35 and the rear-side portion of the tunnel portion 11 positioned in back of the cross member 35 move mutually in the reverse phase, so that this reverse-phase move of the mouth opening deformation causes vibration, thereby generating noises improperly. In the present embodiment, however, this reverse-phase move can be suppressed properly. Herein, since the lower vehicle-body structure of the automotive vehicle of the present embodiment is substantially symmetrical, the structure of the left-side vehicle will be described primarily, and the structure of the right-side vehicle will be denoted by the same reference characters as the one of the left-side vehicle.

As shown in FIG. 4, a front-side mounting seat 41 and a rear-side mounting seat 42 are provided at a lower portion of the tunnel portion 11 to be spaced apart from the single cross member 35 in the vehicle longitudinal direction at the position where the above-described reverse-phase of the tunnel portion 11 becomes considerably large. A front-side mounting seat 43 is provided at a position of the side sill inner 19 which corresponds to the front-side mounting seat 41 such that it faces the front-side mounting seat 41 in the vehicle width direction, and a rear-side mounting seat 44 is provided at a position of the side sill inner 19 which corresponds to the rear-side mounting seat 42 such that it faces the rear-side mounting seat 42 in the vehicle width direction.

The reason why the front-side mounting seat 41 and the rear-side mounting seat 42 are provided at the lower portion of the tunnel portion 11 is that the side walls 11*a*, 22*b* of the tunnel portion 11 deform mutually in the mouth opening direction and in the mouth closing direction, having a fulcrum of the corner portions 11*d*, 11*e* of the tunnel portion 11, and the vibration caused by this deformation becomes great at the lower portion of the tunnel portion 11.

As shown in FIG. 3, the both mounting seats 43, 44 are formed in a boxy shape which opens downward and outward, and include joint flange portions 43*a*, 43*b*, 43*c*, 44*a*, 44*b*, 44*c*, 44*d* which are integrally formed thereat, respectively. The joint flange portions 43*a*, 43*b*, 44*a*, 44*b* are fixedly joined to the floor panel 10, and the other joint flange portions 43*c*, 44*c*, 44*d* are fixedly joined to the side sill inner 19. Further, a bracket 45 is fixedly joined to an upper portion of the front-side mounting seat 43.

Figure 7A:
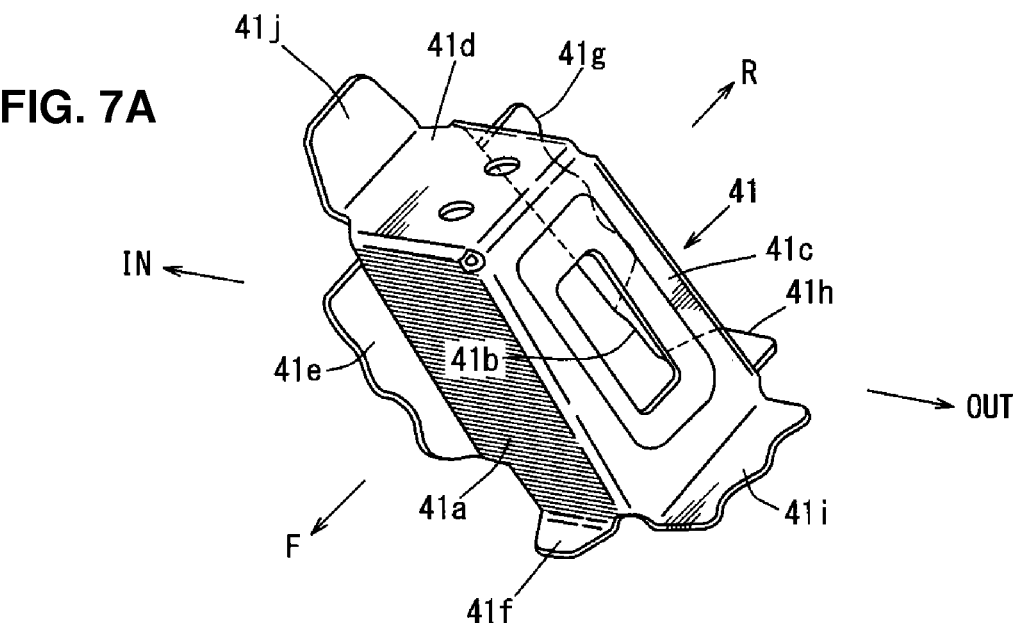
FIG. 7A is a perspective view of a front-side seat-rail mounting seat.
Figure 7B:
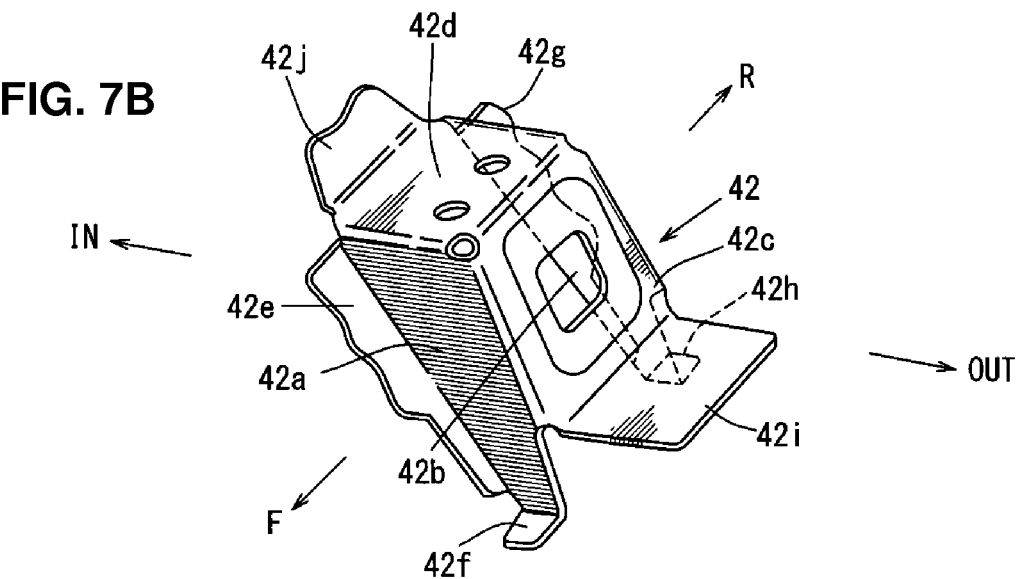
FIG. 7B is a perspective view of a rear-side seat-rail mounting seat.

FIG. 7A is a perspective view of the front-side mounting seat 41, and FIG. 7B is a perspective view of the rear-side mounting seat 42. As shown in FIG. 7A, the front-side mounting seat 41 comprises a front wall 41*a*, a rear wall 41*b*, a side wall 41*c*, and an upper wall 41*d* and is formed in a boxy shape which opens downward and inward, and includes plural joint flange portions 41*e*, 41*f*, 41*g*, 41*h*, 41*i*, 41*j* which are integrally formed therewith.

As shown in FIG. 4, a bracket 46 is provided to cover a tunnel lower-edge groove 14 at a position which corresponds to a mounting position of the front-side mounting seat 41. As shown in FIGS. 4 and 6, an inward-end bending portion 46*a* of the bracket 46 is fixedly joined to lower portions of the side walls 11*a*, 11*b* of the tunnel portion 11, and an outward-end portion of the bracket 46 is fixedly joined to the floor panel 10. The above-described bracket 46 is provided to extend over the tunnel lower-edge groove 14, so that the tunnel lower-edge groove 14 has a high-rigidity closed cross-section structure. Thereby, the present embodiment is configured such that the vehicle-width directional vibration of the side walls 11*a*, 11*b* of the tunnel portion 11 is suppressed.

As shown in FIGS. 4-7, the joint flange portion 41*j* of the plural joint flange portions 41*e*-41*j* of the front-side mounting seat 41 is fixedly joined to the floor panel 10, the joint flange portions 41*f*, 41*h* are fixedly joined to a horizontal portion of the bracket 46, the joint flange portions 41*e*, 42*g* are fixedly joined to the side wall 11*a* or the side wall 11*b* of the tunnel portion 11, and the joint flange portion 41*j* is, as shown in FIG. 6, fixedly joined to a rear portion of the tunnel reinforcement 16 and the side walls 11*a*, 11*b* of the tunnel portion 11 by three-sheet welding means.

In the present embodiment, as shown in FIG. 4, the joint flange portion 41*j* is rigidly connected to the respective members 16, 11 at two longitudinal spot-welding points sw1, sw2. Particularly, the present embodiment is configured such that a tunnel-vibration suppressing area is enlarged forward by rigidly connecting the joint flange portion 41*j* of the front-side mounting seat 41 to the tunnel reinforcement 16.

Meanwhile, as shown in FIG. 7B, the rear-side mounting seat 42 comprises a front wall 42*a*, a rear wall 42*b*, a side wall 42*c*, and an upper wall 42*d* and is formed in a boxy shape which opens downward and inward, and includes plural joint flange portions 42*e*, 42*f*, 42*g*, 42*h*, 42*i*, 42*j* which are integrally formed therewith.

As shown in FIGS. 4, 5 and 7, the joint flange portion 42*i* is fixedly joined to the floor panel 10, the joint flange portions 42*f*, 42*h* are fixedly joined to the tunnel lower-edge groove 14, and the other joint flange portions 42*e*, 42*g*, 42*j* are fixedly joined to the side wall 11*a* or the side wall 11*b* of the tunnel portion 11. Particularly, the front wall 42*a* and the rear wall 42*b* which include the above-described joint flange portions 42*f*, 42*h* are provided at leg portions which extend downward to an inner bottom portion of the tunnel lower-edge groove 14, so that the tunnel lower-edge groove 14 is reinforced by connection of the joint flange portions 42*f*, 42*h* and the tunnel lower-edge groove 14. Thereby, the present embodiment tis configured such that the vehicle-width directional vibration of the tunnel lower-edge groove 14 is suppressed.

Herein, if the longitudinal rigidity of a cabin longitudinal direction in a vehicle frontal collision and the seat supporting rigidity are sufficient (satisfied), the front-side mounting seat 41 may be configured similarly to the rear-side mounting seat 42.

Thus, the front-side mounting seat 41 and the rear-side mounting seat 42 are provided at the lower portion of the tunnel portion 11 to be spaced apart from the cross member 35 in the vehicle longitudinal direction, and a bottom face of a lower rail 50 as the seat rail is rigidly connected to the upper walls 41*d*, 42*d* of the respective mounting seats 41, 42 via spacers 47, 48 shown in FIGS. 5 and 6.

As shown in FIG. 6, a front end portion of the lower rail 50 is fixedly fastened to the spacer 47 and the front-side mounting seat 41 together by two pairs of attaching members 49, such as a bolt and nut, which are arranged in a longitudinal direction of the lower rail 50, so that a bottom face of the lower rail 50 contacts and is rigidly connected to the upper wall 41*d* of the front-side mounting seat 41 via the spacer 47. Thus, the present embodiment is configured such that by rigidly connecting the front end portion of the lower rail 50 to the front-side mounting seat 41 by using the two pairs of attaching members 49, 49, twisting of the mounting seat 41 is received by the lower rail 50 surely.

Likewise, a rear end portion of the lower rail 50 is also fixedly fastened to the spacer 48 and the rear-side mounting seat 42 together by two pairs of attaching members (not illustrated), such as a bolt and nut, which are arranged in the longitudinal direction of the lower rail 50, so that the bottom face of the lower rail 50 contacts and is rigidly connected to the upper wall 42*d* of the rear-side mounting seat 42 via the spacer 48. Thus, the present embodiment is configured such that by rigidly connecting the rear end portion of the lower rail 50 to the rear-side mounting seat 42 by using the two pairs of attaching members similarly to the front end portion, twisting of the mounting seat 42 is received by the lower rail 50 surely.

Herein, in place of the above-described structure in which the bottom faces of the front and rear end portions of the lower rail 50 contact the upper wall 41*d*, 42*d* of the respective mounting seats 41, 42 via the spacers 47, 48, the respect bottom faces of the front and rear end portions of the lower rail 50 may be configured to directly contact the upper wall 41*d*, 42*d* of the respective mounting seats 41, 42 by omitting the spacers 47, 48.

A lower rails 51 as the seat rail is fixedly joined to the pair of front-and-rear mounting seats 43, 44 which are provided on the outward side of the vehicle to face the pair of front-and-rear mounting seats 41, 42 in the vehicle width direction by attaching members, such as a bolt and nut, not illustrated.

As descried above, the single cross member 35 extending in the vehicle width direction is provided between the portion of the side sill 18 positioned near the center pillar 26 and the tunnel portion 11, so that the lightweight of the vehicle and the reverse phase of the mouth opening deformation of the front-side portion of the tunnel portion 11 positioned in front of the cross member 35 and the rear-side portion of the tunnel portion 11 positioned in back of the cross member 35 can be properly attained. Further, the front-and-rear mounting seats 41, 42 for mounting the lower rail 50 are provided at the position where the above-described deformation occurs greatly in the reverse phase, that is—at the lower portion of the tunnel portion 11 to be spaced apart from the cross member 35 in the vehicle longitudinal direction, and the bottom face of the lower rail 50 is rigidly connected to the front-and-rear mounting seats 41, 42. Accordingly, the rigidity of the lower rail 50 becomes so high that the proof stress of the lower rail 50 against the above-described reverse-phase vibration which may cause the lower rail 50 to deform can be properly increased. Thereby, the lower rail 50 can be prevented from being twisted, so that the vibration can be suppressed.

Thus, the lightweight, high rigidity, and quietness of the vehicle can be attained by utilizing the seat structure itself and using the existent lower rail 50, without reinforcing the vehicle body itself.

As shown in FIG. 2, a front seat 60 is longitudinal-movably mounted on the above-described lower rails 50, 51 via upper rails, not illustrated. This front seat 60 comprises a seat cushion frame 61 and a seat back frame 62, and a considerably large deformation load of the tunnel portion 11 is transmitted to an outward side, in the vehicle width direction, of the vehicle body by way of the seat cushion frame 61, thereby attaining dispersion of the load.

Figure 8:
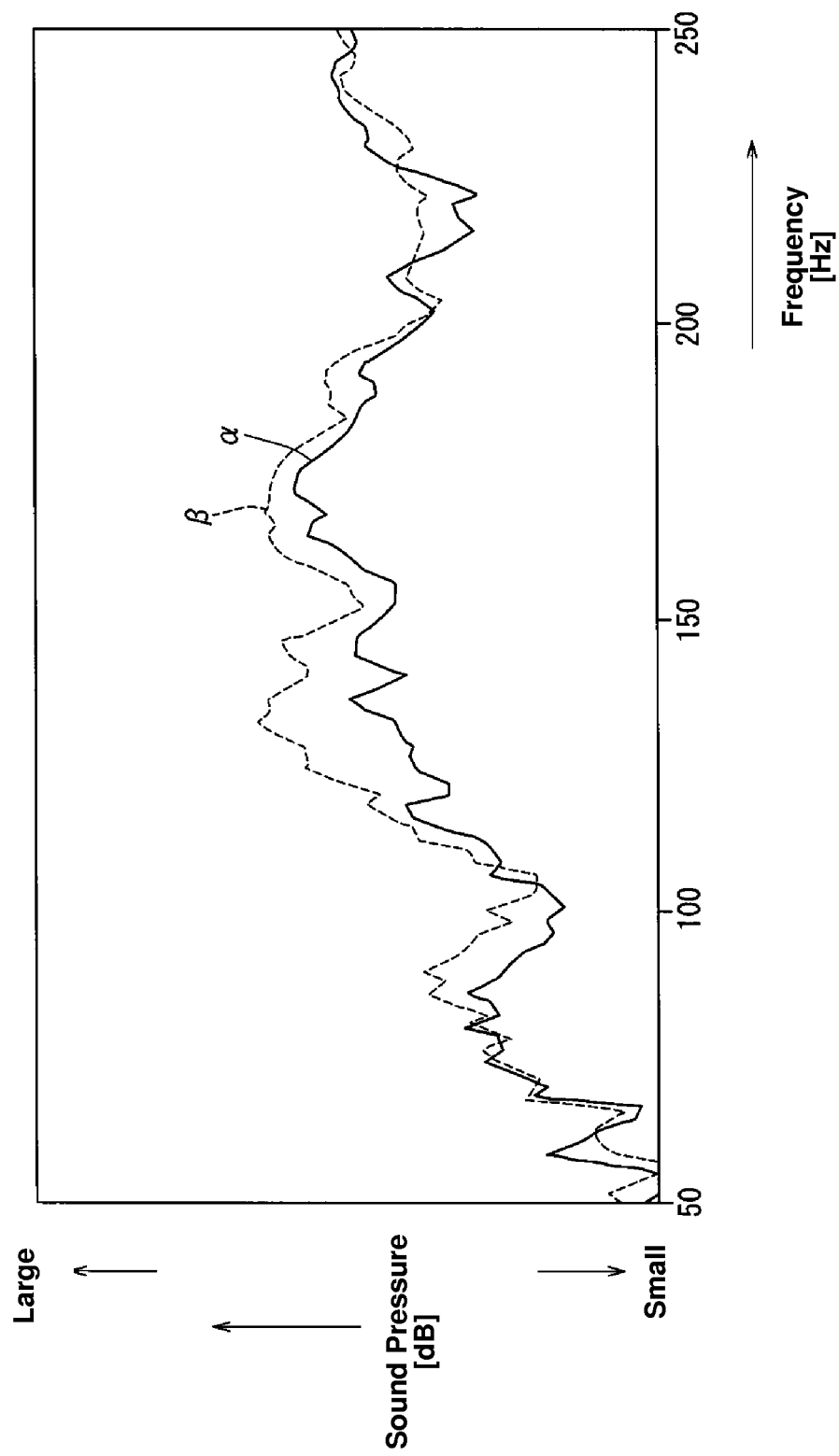
FIG. 8 is a characteristic graph showing characteristics of a sound pressure relative to a frequency.

FIG. 8 is a characteristic graph showing characteristics of a sound pressure (the ordinate) relative to a frequency (the abscissa), which verifies a difference between the embodiment (see a solid line α) and a comparative example (see a broken line β).

The embodiment shown by the solid line α are the characteristics of the lower vehicle-body structure of the automotive vehicle shown in FIGS. 1-7, and the comparative example shown in by the broken line β are the characteristics of a lower vehicle-body structure of the automotive vehicle in which a single cross member is provided at the same position as the present embodiment and a lower rail as the seat rail is simply mounted at a mounting seat via a bracket.

As apparent from FIG. 8, it has been found that noises caused by a sound source (the frequency of 100-200 Hz) of the mouth opening deformation of the tunnel portion 11 of the present embodiment is properly suppressed, compared to the comparative example, and the comparative example is inferior to the comparative example in NVH. In FIGS. 1-7, an arrow F shows a vehicle front direction, an arrow R shows a vehicle rear direction, an arrow IN shows a vehicle inward direction, and an arrow OUT shows a vehicle outward direction.

As described above, the lower vehicle-body structure of the automotive vehicle according to the present embodiment comprises the tunnel portion 11 provided at the central portion, in the vehicle width direction, of the floor panel 10 and extending in the vehicle longitudinal direction, the right-and-left side sills 18, 18 provided at the right-and-left both-side portions of the floor panel 10 and extending in the vehicle longitudinal direction, the right-and-left center pillars 26, 26 extending in the vehicle vertical direction from the right-and-left side sills 18, 18, the right-and-left single cross members 35, 35, each of which extends in the vehicle width direction between the portion of the side sill 18 which is positioned near the center pillar 26 and the tunnel portion 11, the seat-rail mounting seats (see the front-side mounting seat 41 and the rear-side mounting seat 42) provided at the lower portion of the tunnel portion 11 to be spaced apart from the cross member 35 in the vehicle longitudinal direction, and the seat rail (see the lower rail 50) rigidly connected to the seat-rail mounting seats (the mounting seats 41, 42) at its bottom face (see FIGS. 1 and 6).

According to the present structure, since the single cross member 35 extending in the vehicle width direction is provided between the portion of the side sill 18 positioned near the center pillar 26 and the tunnel portion 11, the lightweight of the vehicle and the reverse phase of the mouth opening deformation of the front-side portion of the tunnel portion 11 positioned in front of the cross member 35 and the rear-side portion of the tunnel portion 11 positioned in back of the cross member 35 can be properly attained.

Further, since the seat-rail mounting seats (the front-side mounting seat 41, the rear-side mounting seat 42) are provided at the position where the deformation occurs greatly in the reverse phase, that is—at the lower portion of the tunnel portion 11 to be spaced apart from the cross member 35 in the vehicle longitudinal direction, and the seat rail (the lower rail 50) is rigidly connected to the seat-rail mounting seats at its bottom face, the rigidity of the seat rail (the lower rail 50) becomes so high that the proof stress of the seat rail (the lower rail 50) against the above-described reverse-phase vibration which may cause the seat rail (the lower rail 50) to deform can be properly increased. Accordingly, the seat rail (the lower rail 50) can be prevented from being twisted, so that the vibration can be suppressed. Thereby, the lightweight, high rigidity, and quietness of the vehicle can be attained by utilizing the seat structure itself, without reinforcing the vehicle body itself.

Further, the respective upper portions of the right-and-left center pillars 26, 26 are connected to the roof reinforcement 34 which extends in the vehicle width direction along the lower portion of the roof panel (see FIG. 1).

According to this structure, the ring-shaped frame structure which comprises the roof reinforcement 34, the right-and-left center pillars 26, 26, and the cross members 35 is formed, so that the structure which is highly resistant to twisting of the vehicle body can be provided.

Moreover, the tunnel reinforcement 16 is provided at the upper face of the front portion of the tunnel portion 11, and the rear portion of the tunnel reinforcement 16 and the front seat-rail mounting seat (see the front-side mounting seat 41) are rigidly connected to each other (see FIGS. 4 and 6).

According to this structure, the tunnel-vibration suppressing area can be enlarged forward by the rigid connection of the tunnel reinforcement 16 and the seat-rail mounting seat (the front-side mounting seat 41).

Also, the cross member 35 and the seat rail (the lower rail 50) are provided to be spaced apart from each other (see FIG. 5).

According to this structure, the shape or arrangement position of the cross member 35 can be effectively set against the vehicle side collision regardless of the attachment structure of the seat rail (the lower rail 50) with the properly lightweight structure.

Additionally, the seat-rail mounting seat (the front-side mounting seat 41) is connected to the tunnel lower-edge groove 14 which is provided at the lower portion of the tunnel portion 11 to extend in the vehicle longitudinal direction (see FIGS. 5 and 6).

According to this embodiment, the rigidity of the lower portion of the tunnel portion 11 can be further increased, so that the vibration can be properly suppressed.

The seat-rail mounting seat of the present invention corresponds to the front-side mounting seat 41 and the rear-side mounting seat 42 of the above-described embodiment. Likewise, the seat rail corresponds to the lower rail 50. However, the present invention should not be limited to the above-described embodiment, and any other modifications or improvements may be applied within the scope of a spirit of the present invention.

What is claimed is:

1. A lower vehicle-body structure of an automotive vehicle, comprising:
   a tunnel portion provided at a central portion, in a vehicle width direction, of a floor panel and extending in a vehicle longitudinal direction;
   right-and-left side sills provided at right-and-left both-side portions of the floor panel and extending in the vehicle longitudinal direction;
   right-and-left intermediate pillars extending in a vehicle vertical direction from the right-and-left side sills;
   a pair of single cross members, each of which extends in the vehicle width direction between a portion of the side sill which is positioned near the intermediate pillar and the tunnel portion and is rigidly connected to a side wall of the tunnel portion;
   a pair of longitudinally-separated seat-rail mounting seats provided at a lower portion of the tunnel portion to be spaced apart from the cross member in the vehicle longitudinal direction and is rigidly connected to the side wall of the tunnel portion and the floor panel; and
   a seat rail rigidly connected to the pair of longitudinally-separated seat-rail mounting seats at a bottom face thereof, the seat rail being provided to be spaced apart from the cross member in a vertical direction such that the bottom face of the seat rail is not connected to the cross member and passes above the cross member.

2. The lower vehicle-body structure of the automotive vehicle of claim 1, wherein respective upper portions of said right-and-left intermediate pillars are connected to a roof reinforcement which extends in the vehicle width direction along a lower portion of a roof panel.

3. The lower vehicle-body structure of the automotive vehicle of claim 2, wherein the pair of longitudinally-separated seat-rail mounting seats includes a front-side seat-rail mounting seat, and a tunnel reinforcement is provided at an upper face of a front portion of said tunnel portion, and a rear portion of the tunnel reinforcement and the front-side seat-rail mounting seat are rigidly connected to each other.

4. The lower vehicle-body structure of the automotive vehicle of claim 1, wherein the pair of longitudinally-separated seat-rail mounting seats includes a front-side seat-rail mounting seat, and a tunnel reinforcement is provided at an upper face of a front portion of said tunnel portion, and a rear portion of the tunnel reinforcement and the front-side seat-rail mounting seat are rigidly connected to each other.

5. The lower vehicle-body structure of the automotive vehicle of claim 1, wherein the pair of longitudinally-separated seat-rail mounting seats includes a front-side seat-rail mounting seat, and one of said seat-rail mounting seats is connected to a bottom of a tunnel groove which is provided at the lower portion of the tunnel portion to extend downward below the level of the floor panel in the vehicle longitudinal direction, and formed in a recess shape in a front view of the vehicle, and wherein a bracket is provided to cover a tunnel groove at a position which corresponds to a mounting position of the front-side seat-rail mounting seat.

6. The lower vehicle-body structure of the automotive vehicle of claim 1, wherein the cross member is provided around a longitudinal-center of the pair of longitudinally-separated seat-rail mounting seats.

\* \* \* \* \*